United States Patent
Thoreau et al.

(10) Patent No.: US 6,213,396 B1
(45) Date of Patent: Apr. 10, 2001

(54) METHOD AND SYSTEM FOR DATA TRANSFER

(75) Inventors: Philippe Thoreau, Epinay sur Seine; Serge Bueno, Courcouronnes, both of (FR); Jochen Hertle, Burgstetten (DE); Anders Hjaemare, Graenna; Jesper Engdahl, Oerebro, both of (SE); Kenneth Blomoqvist; Lars J. Olsson, both of Joenkoeping (SE)

(73) Assignees: Robert Bosch GmbH, Stuttgart (DE); Alcatel Alsthom Companie Generale d'Electricite, Paris (FR); Combitech Traffic Systems AB, Joenkoeping (SE)

( * ) Notice: Subject to any disclaimer, the term of this patent is extended or adjusted under 35 U.S.C. 154(b) by 0 days.

(21) Appl. No.: 09/091,379
(22) PCT Filed: Dec. 18, 1996
(86) PCT No.: PCT/EP96/05892
 § 371 Date: Oct. 26, 1998
 § 102(e) Date: Oct. 26, 1998
(87) PCT Pub. No.: WO97/24698
 PCT Pub. Date: Jul. 10, 1997

(30) Foreign Application Priority Data

Dec. 18, 1995 (SE) .................................................. 9504558

(51) Int. Cl.$^7$ ....................................................... G06K 5/00
(52) U.S. Cl. ........................................... 235/384; 235/380
(58) Field of Search ..................................... 235/384, 380, 235/382, 382.5, 375, 370; 705/35, 39, 40, 41, 42, 43, 44

(56) References Cited

U.S. PATENT DOCUMENTS

| | | | | |
|---|---|---|---|---|
| 5,310,999 | * | 5/1994 | Claus et al. | 235/384 |
| 6,019,285 | * | 2/2000 | Isobe et al. | 235/384 |
| 6,034,603 | * | 3/2000 | Steeves | 340/572.01 |
| 6,036,348 | * | 3/2000 | Miura | 364/478.13 |
| 6,040,786 | * | 3/2000 | Fujioka | 340/928 |
| 6,070,146 | * | 5/2000 | Mimata | 705/13 |
| 6,402,008 | * | 3/2000 | Ando et al. | 235/384 |

* cited by examiner

Primary Examiner—Thien M. Le
(74) Attorney, Agent, or Firm—Michael J. Striker

(57) ABSTRACT

A method for data transfer for various applications between a on board unit (OBU), which comprises a processor, memory means and at least one interface to an external entitiy. A sequence of commands is exchanged over the interface and processed by the OBU in order to perform the respective task according to the application of the OBU and/or the external entity. The system for data transfer comprises a macro interpreter in the OBU to receive and interpret the macros from one of its interfaces.

10 Claims, 1 Drawing Sheet

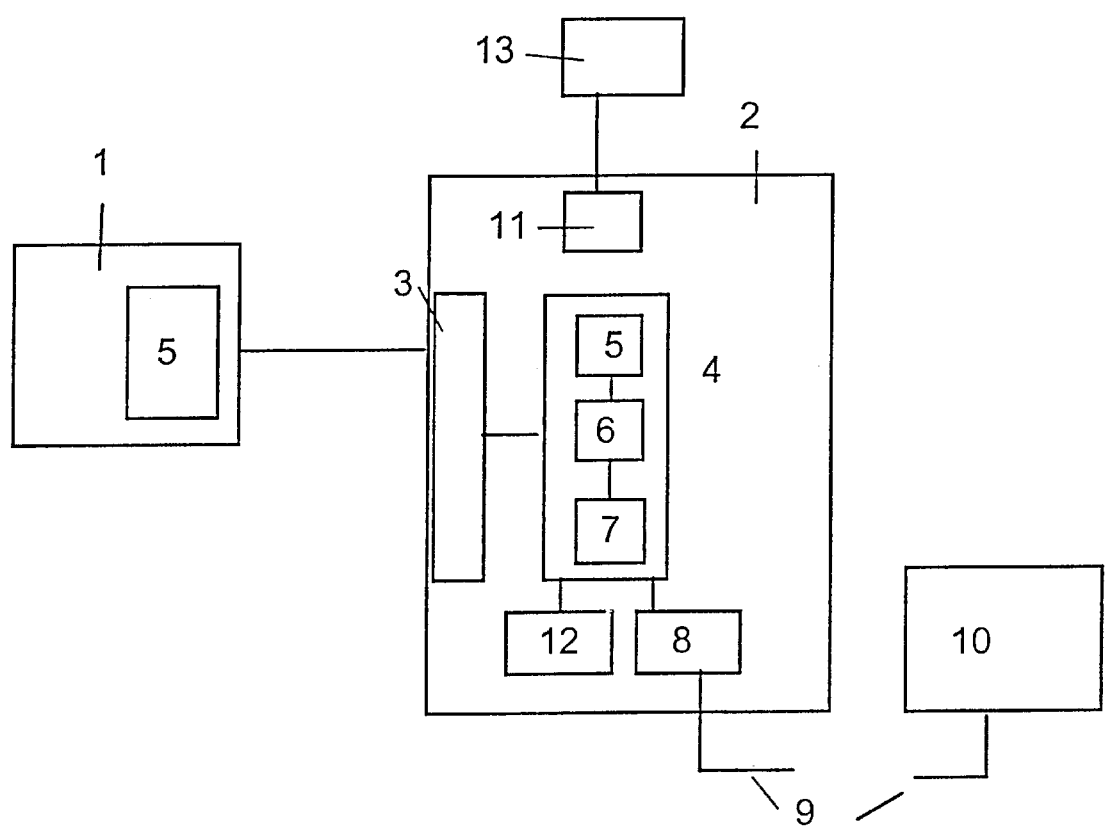

METHOD AND SYSTEM FOR DATA TRANSFER

TECHNICAL FIELD

The present invention relates to a method of data transfer between a on board unit (OBU) and external devices such as integrated circuit card (ICC). The present invention relates further to a system for data transfer by means of radio communication using a transponder. In particular it relates to data transfer for application such as automatic fee collection (AFC) or automatic vehicle identification (AVI).

FR 2 708 764 discloses a vehicle equipment auto-configurable with integrated circuit card comprising an integrated circuit card reader and a memory in which a fixed microprogram is stored designed to process remote-transaction objects. Such an equipment is normally used for performing applications such as automatic fee collection on motorways. The document discloses a microprogram in the on board unit (OBU) which autonomously configures the equipment and adapts it to the special parameters of different applications. For this a fixed routine, which is initiated in response to a detection of an insertion of an ICC into the card reader, retrieves from the ICC parameters defining the specific values of the attributes of remote-transaction objects.

From for example U.S. Pat. No. 4,309,904 (Chasek) a system is known for collecting road toll charges by remote communication by means of microwaves between a stationary installation and communication units in passing vehicles.

Systems known up to now have been designed so that all components have a predetermined connectivity, the equipment of the check point being arranged for a certain type of operation and the computer of the vehicle equipment being constructed and programmed for executing exactly this type of operation and having the ICC adapted to the specific operation and for co-operation with the computer of the vehicle equipment. It means that one obtains a strong locking to the system to which the adaptation has been made, and then a considered vehicle equipment cannot be used within another system, for example a differing system within another territorial area.

Of course it is a great disadvantage; road vehicles can move between different territorial areas and then need to pass check points having systems different from those to which the built-in equipment is adapted. For security reasons the vehicle equipment is usually stationary installed in the vehicle and cannot easily be exchanged or modified.

In general, the communication between ICC and OBU is based on a Master-Slave relationship. The OBU acts as the Master and the ICC acts as the Slave. The active application controls the communication and issues commands to the ICC using an ICC Driver. The Driver is configured according to the capabilities and type of ICC.

There is a family of ISO standards (7816-x) defining the various layers of the protocol between ICC and OBU. However, these standards do not cover the applications, i.e., the organisation and access methods of the data stored on the ICC. Therefore, it is necessary for the specific application and the driver of the OBU to 'know' these structures. Issuing a new ICC requires a re-configuration of the OBU. Usually, this is done by means of a central computing system and a communication network.

As long as the ICC and the OBU is issued by one organisation there is no problem with issuing new cards and re-configuration of OBUs. Examples are: Phone-Cards, Toll-Cards or Personal Identity Cards issued by companies.

For the future it is expected, that the issuer of an ICC is not necessarily responsible for the OBUs (with the exception aspects concerning security, i.e., loading of secret keys into the OBUs, etc.). Furthermore, there will be multi-application ICCs where additional applications are brought onto an already issued ICC card. The OBUs will have to handle a large number of different types of ICCs where the required application is stored on the ICC in a way the OBU does not know a priori.

In one area of use to which the present invention is directed, thus the collecting of vehicle charges by means of wireless communication, a stationary equipment is provided in a number of check points, which are arranged at the entrances to some roads, in particular motor highways, bridges and tunnels which are subject to charges. When passing the check point then a question signal is issued therefrom and is received by a transponder of the passing vehicle, giving rise to response, which is transmitted from the transponder to the check point by means of modulating a signal from the check point. In such more developed systems which are considered here a full series of such question and response messages can be exchanged enabling an entire payment operation, the final result thereof being that money which has been programmed into the ICC inserted in the reader of the vehicle equipment is reduced by the charged amount at the same time as the check points register that the corresponding amount of "electronic money" has been received.

The execution of such a complicated operation requires that the transponder both will be able to provide response messages adapted to several different questions and will be able to accomplish said deduction in the smart card. Then it is not sufficient that the transponder is designed only as a communication unit but the vehicle equipment must also be provided with a computer for processing and producing encoded data including memory equipment for storing programs and results of operations.

In order to achieve it two extreme paths can be chosen: either the vehicle equipment is supplemented with a computer between the transponder and the card reader or the transponder is made to only have the function of a communication unit and all of the computing power is placed inside the ICC. However, the latter alternative is not possible in the case where, in a road toll, a free flow is to be allowed past the check point, also for high velocities, since the communication between the ICC and the transponder through the card reader requires a time period that is too long that a payment operation will have time to be performed for a high velocity of the vehicle. The transmitter of the check point must have a relatively short range both for enabling a selection between different vehicles and because of demands from authorities that the signals must have a limited range. Therefore, in free flow systems it has appeared to be necessary to transfer, before the communication, necessary data from the ICC to a computer coupled directly to the transponder.

SUMMARY OF THE INVENTION

The primary objective of the present invention is to provide a method which allows for more flexible relation between an OBU and an external entity, such as a ICC, as well as for flexible configuration of the OBU.

A method according to this objective is claimed in claim 1. Further preferable embodiments are claimed in the respective subclaims. The general principle is to exchange macros and to provide a macro-interpreter inside the OBU (OBU, card reader) which is able to read the macros and to execute them. This mechanism can be used to perform three different main groups of tasks:

Application specific actions can be performed by the OBU, without previously knowing the structuring of the data for example inside the ICC as well as the access conditions to be fulfilled in order to access the data. This information is provided for example by the ICC implicitly inside the macro. For example the OBU only has to know the location of storage of the macro inside the ICC, and, the 'meaning' of the macro, i.e., the purpose it was designed for. Such application specific actions can be executed upon pressing of buttons of the OBU, or, the execution is triggered by some external events (e.g. commands received from other interfaces of the OBU) or the OBU recognises a specific situation, such as low battery, end of communication etc.

Creation/Initialisation of application specific data held inside the OBU. The values of these data can be created and/or modified autonomously on insertion of a card, by executing a special 'auto-configuration' macro read from the card. Alternatively, the values can be changed by execution of a macro during some transaction, e.g. on pressing buttons of the OBU, or, on commands received via some other interface of the OBU, which triggers the execution of a macro, or the OBU recognises a specific situation.

Configuration or creation of application specific functions of the OBU (e.g., modifying parameters of OBU functions). The functions can be created and/or modified autonomously on insertion of a card, by executing a special 'auto-configuration' macro read from the card. Alternatively, the functions can be changed by execution of a macro during some transaction, e.g. on pressing buttons of the OBU, or, on commands received via some other interface of the OBU, which triggers the execution of a macro, or the OBU recognises a specific situation.

The method according this invention is later explained in more detail together with preferred embodiments.

A further objective of the invention is to provide a system, to use a regionally valid ICC for configuration a generic OBU, so that the OBU can operate efficiently with the regional stationary equipment allowing regional payment schemes. The computer of the OBU shall then be arranged so that ICCs, belonging to different payment systems, can work together with it. The OBU, in particular its computer, shall in addition be capable of working in such a universal way that operations in different systems can be carried out. Thereby it shall thus be achieved that the vehicle equipment without major changes and without adding new components will be able to communicate and execute the operation together with stationary equipment arranged for different applications and versions of applications and at the same time will be able to work within different payment schemes and together with ICC adapted thereto.

By providing this universality of the vehicle equipments, it can be manufactured in large series having lower production costs than in the case where the vehicle equipment must be adapted to each application and payment schemes.

A further objective of the inventional system is to provide a vehicle equipment comprising a transponder, a macro interpreter, a computer, arranged for the control of the transponder and arranged to execute, when receiving instructions in the form of macros from the stationary equipment and optionally interfaces for communication with external entities, such as integrated circuit card or other electronic devices. The electronic devices could be an satellite navigation systems, vehicle computer, communication centre.

DESCRIPTION OF PREFERRED EMBODIMENTS

The general function is now explained in connection with the only FIGURE. On the ICC 1 there is stored a set of macros 5 and the card reader 3 reads these macros. A macro consists of a sequence of instruction to be executed by the macro interpreter 7. The card reader 3 is connected to the computer 4, comprising a processor 5 a memory 6 and a macro interpreter 7. The communication between the OBU 2 and the stationary equipment 10 is performed with radio signals using an transponder 8 and antennas 9. The user can interact with the OBU 2 via the Man Machine Interface (MMI) 12. Furthermore external electronic devices such as satellite navigation systems 13 con communicate with the OBU 2 via a serial interface 11.

The following definitions are used for equipment according to the invention.

Stationary equipment: active radio transmitter and receiver equipment, preferably for microwaves, arranged in a traffic check point such as a road toll and controlled by a computer for generating data for transmission and for processing and registering arriving, data during reception.

Vehicle equipment: An equipment placed in respective vehicles provided for exchange of data with the stationary equipment. The vehicle equipment is including the following functional units: On board unit (OBU), integrated circuit card (ICC), external electronic devices.

The OBU comprises a transponder, a computer, a macro interpreter, optionally a man machine interface and other interfaces, such as a card reader.

Transponder: a transmitter and receiver equipment in the OBU and arranged to receive radio signals and to transmit radio signals after modulation, so that it is possible to reply to the received radio transmitted message by means of transmitting a response message (a transponder can be designed for such signal processing that less complicated response messages or even response sequences can be generated by the unit that is usually called a transponder— here however it is presupposed that a more complicated signal processing and generation is supported by a computer).

Computer: a computer comprising a read and write memory for storing programs and data, a processor and a macro interpreter, connected to the transponder for receiving data, processing them and generating data for retransmission through the transponder. Optionally, the computer attends to communication with a integrated circuit card through a card reader (see below).

Card reader: reader for ICCS, arranged to receive data from the card and forward them to the vehicle computer and vice versa.

ICC (integrated circuit card): at least a memory unit for storing data and optionally a microcomputer for processing. The ICC is provided to the OBU through the card reader.

A macro defines e.g. the complete message sequencing towards the ICC and all actions necessary to perform a certain task of the OBU.

Another possible feature of the macros is to provide a fixed return value after execution, with could be displayed by the OBU.

Another feature of the macros 5 stored on ICCs 1 is to re-configure OBUs 2. This means that the ICC contains macros which are executed by the OBU upon a user request, or, autonomously after insertion of the ICC. The result of the execution is a changing and/or creation of data and/or functions inside the OBU. For example, in systems for Automatic Fee Collection (AFC) the ICC may carry an electronic purse where the fee is debited from, or, some identification code referring to the users account. It is an advantage to configure the OBU by means of an ICC macro. This feature can be used to transfer vehicle related parameters into the OBU (personalisation of OBU). Alternatively, the behaviour of the OBU with respect to other interfaces can be altered by means of re-configuration.

The general applications of macros as already mentioned above read from ICCs are in the following further specified without limiting the scope of the invention to the embodiments.

A first group of applications are application specific actions performed by the OBU, for example:

An electronic purse implemented on an ICC can be debited by the OBU by simply executing a macro with meaning 'Debit X units', which is provided by the ICC. This is an example for a macro having a parameter 'X' which is to be filled in by the OBU. Example: The ICC carries an electronic purse and the OBU is used for debiting a certain amount of money from these purses. The user requests the OBU to debit 5 ECU from the purse. As the OBU knows where to find the macro 'Debit X ECU' on the ICC, it is able to down-load this macro and execute it with the parameter '5 ECU'. The macro contains all necessary steps and messages to perform the transaction. Hence, the OBU does not need any explicit knowledge about the structure of the electronic Purse and the location of storage. It only has to have access to the required keys which are used for achieving security. The return value of the macro could indicate the success or failure of the transaction. The issuer of the purse can thus use arbitrary ICCs which are already on the market, as long as he provides in addition a macro and stores it on the ICC together with the purse application.

Reading of application specific data from the ICC and display them on the OBU's display.

Writing of some logging information into the ICC.

Closing an ICC session autonomously by the OBU. Assume, the ICC is accessed by the stationary equipment, using the OBU as a transparent channel. If the link between the stationary equipment and the OBU is interrupted, the OBU may execute autonomously some 'post-processing macro', provided by the ICC to properly conclude a session in such exceptional situations.

A second group of applications deals with configuration/ initialisation and/or creation of application specific data inside the OBU, for example:

If the OBU is used for AFC, vehicle related parameters should be stored inside the OBU and not inside the ICC. On insertion of a special configuration ICC, these data can be transferred from the ICC to the OBU. The ICC provides an 'auto-configuration macro' which implicitly contains the necessary instruction for this task.

For faster access to application data stored on the ICC, there is the possibility to temporary store an 'image' of the ICC's data inside the OBU. This can be achieved by some 'preparation macro' provided by the ICC and executed autonomously by the OBU on insertion of the ICC. This preparation is helpful in some high-speed applications like AFC.

A third group concerns the configuration and/or creation of application specific functions inside the OBU (e.g., modifying parameters of OBU functions), for example:

The ICC provides parameters needed for some routines inside the OBU to properly communicate via other external interfaces of the OBU, e.g. the radio interface used for communication with the stationary equipment. These parameters can be copied from the ICC by means of executing a 'preparation-macro', or, an 'auto-configuration macro'.

The ICC provides parameters and data which change resp. complete internal system data of the OBU, e.g. look-up tables used to access attributes inside the ICC etc. which are accessed by external interfaces. Again, these parameters can be read from the ICC during execution of a macro provided by the ICC.

The ICC provides macros, which are executed upon pressing of OBU buttons. This can be used to generally configure the MMI of the OBU.

One objective of the invention is that the vehicle equipment will have the capability of being universal so that it can co-operate with different applications preferably fee collection when passing a check point. Then it is assumed that the vehicle equipment co-operates with a ICC while having a connection to the stationary equipment of the check point. This transaction results in reducing data representing money or identifying the user's account.

To arrange the operation in such a way that it can be executed in spite of the short time available for the communication between the stationary equipment and the vehicle equipment, the operation can be structured in a manner which will be described later on:

By travel of the vehicle the ICC can or must be displaced between different areas, furnished with different payment schemes and different contracts between the user and the road operator. In order to be used in various areas the vehicle equipment therefore must be able to co-operate through the transponder with different stationary equipment and different applications.

In order to reach said purpose of the invention to make the vehicle equipment adapted to be used within different system the OBU is provided with a macro interpreter, which when introducing the card into the card reader of the vehicle equipment executes a macro in the computer of the OBU, for a signal processing adapted to the communication system and to the application of the present area. The method of use is thus that if a vehicle travels into an area where the stationary equipments do not work according to the system for which the computer at the instant is programmed, the ICC inserted in the vehicle equipment will program or reprogram the vehicle computer, so it will be adapted to be used within the territorial area in question and also adapted to the payment system thereof. Consequently by means of the ICC the vehicle equipment is configured to operate according to the signal processing system an up to the application that is valid for the area in question.

Also, for the application data stored on the ICC memory is reserved in the computer, that is finally initialised according to the card connected to the computer. The card must then be provided with the corresponding data for a final programming of the reserved memory.

In the following some explanations and further information will be given around the items discussed above. Then first the method of dividing the data processing into an operation in a preparatory stage, a real time stage executed during the radio signal communication and a post processing stage is discussed.

The preparatory phase consists of reading data and/or function parameters into the vehicle computer and/or processing commands. Possibly, all of the preparatory stage is executed according to a macro stored on the ICC.

The period of time of the part of the payment operation which is performed by means of radio communication during the passage of the toll station has to be kept as small as possible.

The post processing stage can be executed when the communication area has been left. Therefore the computer should have a command queue where commands from the stationary equipment (write commands, containing the data which are to be written and where they are to be written) can be stored until they can be processed by the vehicle computer. Optionally the OBU can autonomously execute a post processing macro.

There is a wish of manufacturing and selling data equipped OBUs in large quantities without configuring them for one specific application. Certain countries or regions can have or will have, in a later stage when already many OBUs are in circulation, special demands for the application, i.e. for the way in which data are to be processed in the vehicle equipment. In such a situation the issuer of the OBUs does not want to be forced to recall millions of OBUs or modifications/exchange.

Said solution comprising a macro interpreter and macros stored on the ICC implies that not only data but even functions operation on data can be created and/or configured/initialised inside the OBU.

In a other preferred embodiment the macros are provided to the OBU through other interfaces of the OBU such as the radio signal communication interface or a serial interface to other external electronic devices such as a communication centre or a satellite navigation system, or a external vehicle computers.

What is claimed is:

1. A method of data transfer between an on board unit including a processor, memory means and interfaces, to an external entity including an integrated circuit card, the method comprising the steps of communicating between a stationary equipment and the on board unit by means of radio signal; communicating between the integrated circuit card and the on board unit by radio signal; knowing by the on board unit a location of storage of at least one predetermined sequence of commands formed as macros stored inside the integrated circuit card; exchanging the macro over one of interfaces and processing in the on board unit without previously knowing a structuring of data in order to teach the on board unit how to perform respective tasks.

2. A method as defined in claim 1, wherein said communicating between the stationary equipment and the on board unit is performed between the stationary equipment and a transponder inside the on board unit.

3. A method as defined in claim 1, wherein said processing includes processing in the on board unit without previously knowing a structuring of data in order to teach the on board unit how to perform the respective tasks according to an application of the on board unit.

4. A method as defined in claim 1, wherein said processing includes processing in the on board unit without previously knowing a structuring of data in order to teach the on board unit how to perform the respective tasks according to an application of the stationary equipment.

5. A method as defined in claim 1; and further comprising the step of processing an execution of at least one macro in order to perform a specific task of the on board unit.

6. A method as defined in claim 1; and further comprising the step of processing an execution of at least one macro in order to perform a specific task of a system connected to the on board unit.

7. A system for data transfer by means of radio communication, comprising an on board unit for operations between a stationary equipment and said on board unit, said on board unit including a receiver and transmitter equipment formed as a transponder, a computer with a processor and a memory unit connected to said transponder for receiving signals, processing them and generating signals for retransmission through said transponder by means of a modulation of the signals, said on board unit communicating with at least one external entity, said on board unit including a macro interpreter and being formed so as to read at least one sequence of commands formed as macros and/or parameters from a known location stored inside of the external entity without previously knowing a structure of the macro, said on board unit interpreting the macros and/or storing the parameters in order to perform a respective task according to an application of said on board unit and/or the external entity.

8. A system as defined in claim 7; and further comprising interface means through which said on board unit communicates with the at least one external entity.

9. A system as defined in claim 7, wherein said on board unit is formed to read from an integrated circuit card.

10. A system as defined in claim 7, wherein said on board unit is formed to read from an electronic device connected to said on board unit.

* * * * *